Nov. 11, 1952     R. P. DEL PICO     2,617,418
VACCINATOR
Filed Dec. 30, 1950
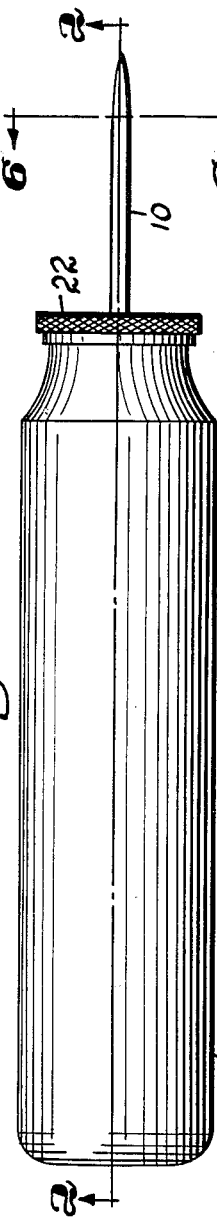
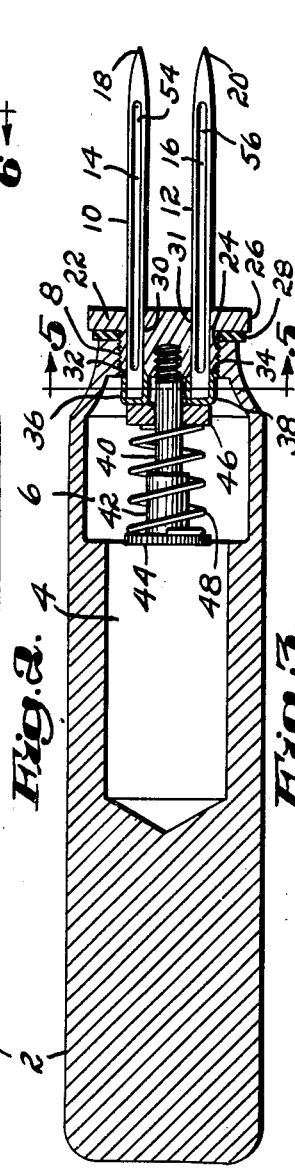
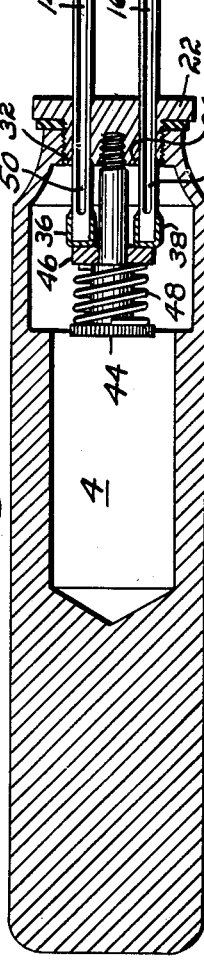
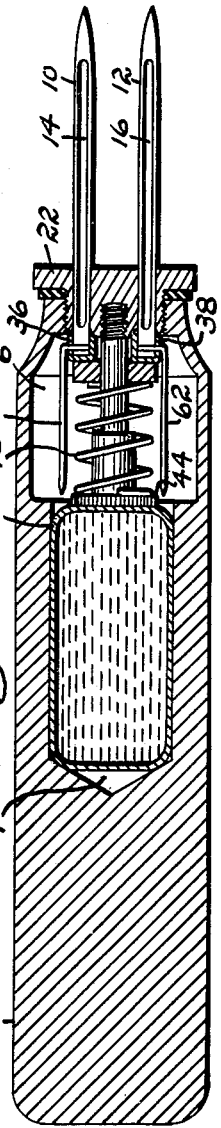
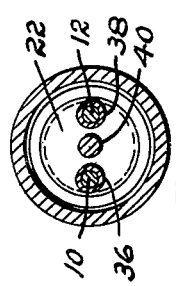
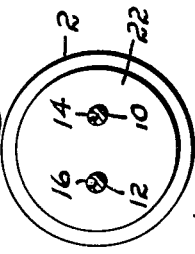
Inventor:
Roland P. Del Pico,
by Hadley Chittick
Attorney Patented Nov. 11, 1952

2,617,418

UNITED STATES PATENT OFFICE 2,617,418

VACCINATOR

Roland P. Del Pico, South Braintree, Mass.

Application December 30, 1950, Serial No. 203,677

6 Claims. (Cl. 128—253)

This invention relates to vaccinators used for vaccinating poultry and particularly chickens.

In the commercial raising of poultry, it has been found necessary to vaccinate the birds with a virus to protect them against certain diseases among which are those known as fowl pox and Newcastle.

Up to the present, one of the methods of vaccination has consisted of driving a pointed instrument through the web between the wing and breast of the bird, the instrument carrying with it a certain quantity of the virus which in this way gets into the bird's circulatory system. This work requires the services of three men. A group of birds are first collected in a cage. One man reaches into the cage, grabs a bird, passes it to a second man who spreads the wing so that the web is stretched relatively taut and a third man does the vaccinating. Obviously, to do this to a large number of birds, as will be found in any commercial poultry raising establishment, is a physically tiring operation and if any failure in the vaccinating process occurs, it cannot be recognized at the time. The recognition comes later when the unvaccinated bird becomes sick.

It is, therefore, of the utmost importance that the vaccinating instrument must be of a character which is absolutely certain to function properly each time it is used on a bird. The devices known to the industry and used up to the present time are not of an automatic character. Instead they require the operation of a piston or plunger which must be actuated at the instant the needle is plunged through the web. The physical co-ordination required of the operator is such that invariably certain birds will not be properly inoculated, with subsequent loss to the owner.

Accordingly, the present invention contemplates a vaccinator automatic in character which invariably will deliver into the bird's web an exact and sufficient quantity of virus to bring about proper vaccination. The present invention requires no judgment or co-ordinated action on the part of the operator other than the physical movement of jabbing the needles of the vaccinator through the bird's web.

The invention will be more clearly understood by the following description and the accompanying drawings in which Fig. 1 is an elevation of the vaccinator.

Fig. 2 is a section on the line 2—2 of Fig. 1 with the valves in closed position.

Fig. 3 is a view similar to Fig. 2 with the valves in open position.

Fig. 4 is a modification of the invention.

Fig. 5 is a section on the line 5—5 of Fig. 2.

Fig. 6 is a section on the line 6—6 of Fig. 1.

As is shown in the drawing, the vaccinator comprises a handle member 2 which includes therein a cavity or reservoir 4 for a suitable quantity of virus in solution. The forward end of the reservoir is somewhat enlarged at 6 and narrows down to a threaded neck 8.

The injecting mechanism comprises a pair of needles 10 and 12. These needles are fluted on one side at least, as at 14 and 16. A sectional view of the needle is shown in Fig. 6. The points of the needles 18 and 20 are sharp enough to penetrate readily the webs of the birds. The rear ends of the needles are slidably mounted in a supporting closure member 22 which is screw threaded as at 24 to engage threads 8 of the neck of the container. A knurled widened flange 26 facilitates screwing the closure member into place and a washer 28 serves to provide a positive seal.

The needles pass through the member 22 in cylindrical openings 30 and 31 with a clearance small at all areas of contact excepting the area opposite the grooves 14 and 16. The inner ends of the openings 30 and 31 terminate in tapered conical valve seats 32 and 34. These valve seats are engaged by corresponding surfaces on the inner ends of caps 36 and 38 which are affixed to the inner ends of the needles 10 and 12 and act as valves in cooperation with the valve seats. The engaging surfaces of the caps and seats are ground to provide, when closed, a liquid tight construction.

The needles 10 and 12 are freely slidable through member 22 in their respective openings 30 and 31 but are normally held in the closed position shown in Fig. 2 by a spring arrangement which comprises a central stem 40 screw-threaded into the rear of member 22. The stem has an enlarged stop portion 42 and a terminal circular flange 44 acting as a spring engaging member. A member in the form of a centrally apertured disc 46 is slidably mounted on stem 40. Between the disc and the flange 44 is a compression coil spring 48. The spring acting through disc 46 constantly urges the valves 36 and 38 and the attached needles to the closed position shown in Fig. 2.

When adequate pressure is exerted against the ends of the needles, they will be moved to the position shown in Fig. 3 in which situation the valves 36 and 38 will be moved away from valve seats 32 and 34. The grooves 14 and 16 now provide a passage for communication between the reservoir and the outside atmosphere. It is apparent that if the liquid virus in the reservoir is to flow out through the grooves a certain amount of air must enter the reservoir to replace the liquid. Accordingly, as the needles are moved inwardly to expose the inner ends of the grooves to the reservoir a limited amount of air will flow into the reservoir, immediately after which the virus will flow into the grooves and down into those parts of the grooves that are within the confines of the member 22. When the virus reaches this position further entrance of air into the reservoir is prevented and by the same token no more virus will flow into the grooves.

Thus by controlling the inward stroke of the needles, the amount of virus that will be introduced into the grooves on each operation of the vaccinator will likewise be accurately controlled so that the available amount of virus in the grooves at the time of the next vaccination of a bird will be equal to the previous quantity introduced.

It should be noted that while the vaccinator is shown in the drawings in horizontal position, when in use it will normally be held with the needles pointed downwardly so that the virus in the reservoir will always be present in the area surrounding the valves and will always enter the grooves in the manner just described.

When the pressure is removed from the ends of the needles, they will resume the positions shown in Fig. 2. The virus that was collected or picked up by the inner ends 50 and 52 of the grooves 14 and 16 when the needles were retracted as in Fig. 3 will now be able to flow downwardly along the grooves to reach a position at the other ends of the grooves as at 54 and 56.

It is believed apparent from this description, that repeated movements of the needles in and out while the vaccinator is held in a generally vertical position with the needles downward will result in substantially equal measured quantities of virus feeding into the inner ends of the grooves as at 50 and 52 to flow continuously downward toward the points of the needles from which substantially the same quantity of the virus will be intermittently removed during the use of the instrument in the vaccinating operation.

The sharpness of the needles, the diameter of the needles and the strength of spring 48 are all carefully adjusted so that each time the needles are thrust through the chicken's web the resistance to penetration will be sufficient to move the needles from the closed position of Fig. 2 to a maximum inward position as in Fig. 3, thus opening valves 36 and 38 to allow additional virus to move into the grooves at 50 and 52. The inward movement of the needles is limited by engagement of disc 46 with stop 42. While this penetrating movement is occurring, some of the virus which is in the outer ends and the remaining exposed portions of the grooves will be wiped off by the web as the needles pass therethrough. The carrying capacity of grooves 14 and 16 has also been carefully calculated to insure that the amount left in the web of the bird during penetration and removal of the needles will always be sufficient to insure its being vaccinated.

As the user withdraws the needles from the web, the frictional resistance thereto plus the force of spring 48 will cause the needles to return to the position of Fig. 2 but carrying with them the additional measured supply of virus. It is believed obvious that through the use of this instrument a large number of chickens may be readily vaccinated through an operation which required no more skill than the mere forcing of the needles through the web of the chicken and then withdrawing the needles thereby placing the vaccinator in condition for use on the next bird.

The use of two needles gives greater assurance that vaccination will occur than if reliance were placed on a single needle. It also provides that the frictional resistance encountered in forcing the needles through the web will be adequate to force the needles inwardly the full distance so that an adequate amount of virus will flow into the grooves on each use to keep the outer ends of the grooves supplied at all times with a sufficient quantity. However, it is to be understood the number of needles may be increased if it is deemed necessary to transmit a greater quantity of virus to the bird or may be decreased to a single needle if that is considered adequate.

Since the container 4 is sealed when valves 36 and 38 are closed there can be no evaporation and the instrument remains ready for use at all times. When the virus in the container is exhausted, the member 22 is unscrewed and removed carrying with it the entire needle structure. The container is then filled with a new quantity of virus and on the replacement of member 22, the unit is immediately ready for further use.

A modified form of the invention is shown in Fig. 4. In some instances it may be desirable to supply the virus to the user ready-mixed in a suitable container. Such container, for example, might be made of one of the plastic sheets now commonly available. Accordingly, in Fig. 4 the virus, instead of being poured directly into the reservoir 4, is supplied in a flexible puncturable sealed container or sac 58 which may be distorted sufficiently to slide it in through the open neck of the handle. After it is in position, as shown in Fig. 4, the member 22 is then screwed in place in the usual manner. At this stage, of course, there will be no virus in the area 6 as it is still sealed within container 58. I have, therefore, provided puncturing means which is attached to the needles so that upon the first movement of the needles inwardly, the container will be punctured and the virus may then flow into and fill cavity 6, it being remembered, of course, that the needles in use will be held pointed downwardly. The puncturing mechanism shown comprises two spears 60 and 62 which are affixed to the ends of the needles in any suitable manner. The spears are spaced far enough apart to pass by the flange 44 and to penetrate the end of container 58 sufficiently to permit the virus solution to escape therefrom.

While the invention has been shown and described by reference to a specific form of the invention, it will be understood that it is my intention to cover all changes and modifications of the example of the invention herein chosen for purposes of the disclosure which do not constitute departures from the spirit and scope of the invention.

I claim:

1. A vaccinator for vaccinating poultry comprising a handle and a reservoir associated therewith, a removable closure member for sealing said reservoir, a plurality of needles pointed for facilitating penetration of a fowl's web, said needles being parallel to each other and extending through said closure member in slidable relation thereto, a valve on each of said needles located within said reservoir, a seat on said closure member for each of said needles, each said seat surrounding said needle and adapted to be engaged by the corresponding valve, a groove in each needle extending a major distance along said needle with its outer end terminating in the exposed part of the needle and its inner end terminating on the outlet side of said seat when the valve of said needle is closed, a stem extending from said closure member inwardly of said reservoir and symmetrically disposed with respect to said needles, a spring engaging member on said stem spaced from said closure member, a slidable member on said stem for engaging the inner ends of said needles, a coiled spring surrounding said stem and positioned between said spring engaging member and said slidable member, said spring being under compression and constantly urging the valves of said needles toward closed position, said spring being capable of being flexed sufficiently by inward sliding movement of said needles with respect to said closure member as may be caused by the resistance of a fowl's web to penetration of said needles to allow the inner ends of said grooves to be exposed to said reservoir whereby liquid virus in said reservoir may enter that portion of the grooves that is exposed in said reservoir, each inward movement of said needles permitting a limited quantity of air to enter said reservoir to replace the liquid virus that enters said grooves on each said inward movement.

2. A vaccinator as in claim 1, and means for limiting the inward movement of said slidable member on said stem.

3. A vaccinator for vaccinating poultry comprising a handle and a reservoir associated therewith, a removable closure member for sealing said reservoir, a needle having a point thereon for facilitating penetration of a fowl's web and passing through and in slidable relation with said member, a valve on said needle within said reservoir, a seat on said member surrounding said needle adapted to be engaged by said valve, a spring acting independently of said reservoir and constantly urging said valve toward closed position, a groove in said needle extending a major distance along said needle with its outer end terminating in the exposed part of the needle and its inner end terminating on the outlet side of said seat when the said valve is closed, said spring being capable of being flexed sufficiently by inward sliding movement of said needle with respect to said closure member as may be caused by the resistance of a fowl's web to penetration of said needle to allow the inner end of said groove to be exposed to said reservoir whereby liquid virus in said reservoir may enter that portion of the groove that is exposed in said reservoir, each inward movement of said needle permitting a limited quantity of air to enter said reservoir to replace the liquid virus that enters said groove on each said inward movement, a second needle similar to said first needle, paralleling said first needle, and means for applying the pressure of said spring equally to the inner ends of said needles.

4. A vaccinator for vaccinating poultry comprising a handle and a reservoir associated therewith, a removable closure member for sealing said reservoir, a needle having a point thereon for facilitating penetration of a fowl's web and passing through and in slidable relation with said member, a valve on said needle within said reservoir, a seat on said member surrounding said needle adapted to be engaged by said valve, a spring acting independently of said reservoir and constantly urging said valve toward closed position, a groove in said needle extending a major distance along said needle with its outer end terminating in the exposed part of the needle and its inner end terminating on the outlet side of said seat when the said valve is closed, said spring being capable of being flexed sufficiently by inward sliding movement of said needle with respect to said closure member as may be caused by the resistance of a fowl's web to penetration of said needle to allow the inner end of said groove to be exposed to said reservoir whereby liquid virus in said reservoir may enter that portion of the groove that is exposed in said reservoir, each inward movement of said needle permitting a limited quantity of air to enter said reservoir to replace the liquid virus that enters said groove on each said inward movement, said closure member having a stem mounted thereon that extends into said reservoir, a disc slidable on said stem, a spring engaging member fixed on said stem, said spring being a coiled spring and located between said disc and said spring engaging member and constantly urging said disc against said needle.

5. A vaccinator for vaccinating poultry comprising a handle and a reservoir associated therewith, a removable closure member for sealing said reservoir, a needle having a point thereon for facilitating penetration of a fowl's web and passing through and in slidable relation with said member, a valve on said needle within said reservoir, a seat on said member surrounding said needle adapted to be engaged by said valve, a spring acting independently of said reservoir and constantly urging said valve toward closed position, a groove in said needle extending a major distance along said needle with its outer end terminating in the exposed part of the needle and its inner end terminating on the outlet side of said seat when the said valve is closed, said spring being capable of being flexed sufficiently by inward sliding movement of said needle with respect to said closure member as may be caused by the resistance of a fowl's web to penetration of said needle to allow the inner end of said groove to be exposed to said reservoir whereby liquid virus in said reservoir may enter that portion of the groove that is exposed in said reservoir, each inward movement of said needle permitting a limited quantity of air to enter said reservoir to replace the liquid virus that enters said groove on each said inward movement, said closure member having a stem mounted thereon that extends into said reservoir, a disc slidable on said stem, a spring engaging member fixed on said stem, said spring being a coiled spring and located between said disc and said spring engaging member and constantly urging said disc against said needle, and means for limiting movement of said disc toward said spring engaging member.

6. A vaccinator for vaccinating poultry comprising a handle and a reservoir associated therewith, a removable closure member for sealing said reservoir, a needle having a point thereon for facilitating penetration of a fowl's web and passing through and in slidable relation with said member, a valve on said needle within said reservoir, a seat on said member surrounding said needle adapted to be engaged by said valve, a spring acting independently of said reservoir and constantly urging said valve toward closed position, a groove in said needle extending a major distance along said needle with its outer end terminating in the exposed part of the needle and its inner end terminating on the outlet side of said seat when the said valve is closed, said spring being capable of being flexed sufficiently by inward sliding movement of said needle with respect to said closure member as may be caused by the resistance of a fowl's web to penetration of said needle to allow the inner end of said groove to be exposed to said reservoir whereby liquid virus in said reservoir may enter that portion of the groove that is exposed in said reservoir, each inward movement of said needle permitting a limited quantity of air to enter said reservoir to replace the liquid virus that enters said groove on each said inward movement, a second needle similar to said first needle, paralleling said first needle, a spring engaging member affixed to said closure member and spaced therefrom, said spring bearing against said engaging member and means for applying the pressure of said spring equally to the inner ends of said needles.

ROLAND P. DEL PICO.

REFERENCES CITED

The following references are of record in the file of this patent:

UNITED STATES PATENTS

| Number | Name | Date |
|---|---|---|
| 697,700 | Alden | Apr. 15, 1902 |
| 2,299,627 | Hunter et al. | Oct. 20, 1942 |
| 2,512,882 | Truesdale | June 27, 1950 |